(No Model.)

J. D. WHITE.
DRAFT EQUALIZER.

No. 344,702. Patented June 29, 1886.

Witnesses:
E. J. Walker
Wm. E. Dyre

Inventor,
John D. White
by his attorney

United States Patent Office.

JOHN D. WHITE, OF WORTHINGTON, IOWA.

DRAFT-EQUALIZER.

SPECIFICATION forming part of Letters Patent No. 344,702, dated June 29, 1886.

Application filed May 3, 1886. Serial No. 200,943. (No model.)

*To all whom it may concern:*

Be it known that I, JOHN D. WHITE, a citizen of the United States, residing at Worthington, in the county of Dubuque and State of Iowa, have invented certain new and useful Improvements in Three-Horse Draft-Equalizers; and I do hereby declare the following to be a full, clear, and exact description of the invention, such as will enable others skilled in the art to which it appertains to make and use the same.

My invention relates to three-horse draft-equalizers; and its object is to furnish an equalizer simple in construction and effective in operation, it being so constructed that the draft may be distributed equally among the three horses, or readily adjusted so that the middle horse may be required to draw more or less than each of the other horses.

To this end my invention consists of certain arrangements and combinations of parts, as will be particularly pointed out in the claims at the close of this specification.

In order that my invention may be clearly understood, I have illustrated in the annexed drawings, and will proceed to describe, a practical form thereof.

Figure 1:
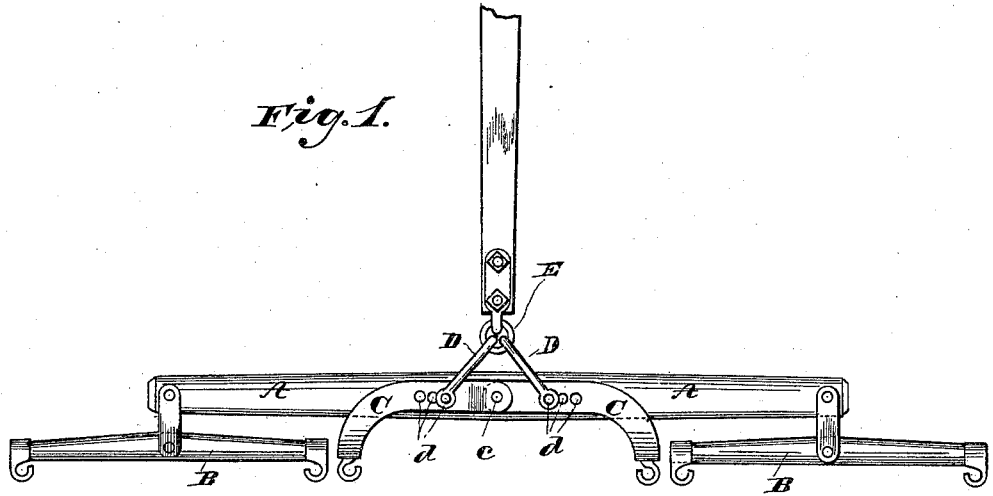
Figure 2:
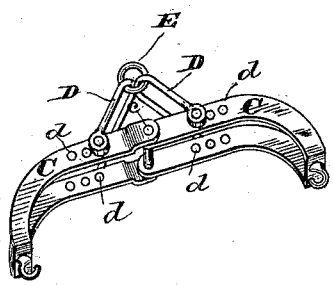

Figure 1 represents a plan view of my improved equalizer as applied to the beam of a plow. Fig. 2 represents a perspective view of the trace-levers and draft-links to which the middle horse is hitched.

The same letters of reference indicate identical parts in each of the figures.

In the drawings, A represents the double-tree of the equalizer, at the ends of which the single-trees B B are connected in any suitable manner, to which single-trees the outside horses are hitched.

At a point, c, in the center of the double-tree is fulcrumed one end of each of two levers, C C, to the outer ends of which the traces of the middle horse are respectively hitched, and which I term the "trace-levers." These trace-levers C C may be made of straight bars fulcrumed on one side only of the double-tree; but I prefer to make them forked, as shown in Fig. 2, so as to embrace the double-tree, for the purpose of limiting their rearward movement by the double-tree coming in contact with their curved ends, and also for increasing their strength.

At a suitable point on each of the trace-levers C C is pivoted a draft-link, D. I have shown the draft-links D D as coupled together by a ring, E, by which the equalizer is coupled to the plow or object to be drawn; but it is obvious that instead of using a ring, E, the draft-links D D may be constructed with eyes to fit over a pin or hook on the plow or other object.

The trace-levers C C are provided with a number of holes, *d d*, for adjusting the draft-links D D, so that the middle horse may be made to draw more or less of the load than each of the other horses, as desired; but in all cases, when the horses are drawing the amount of the load respectively assigned to them, the tug-hooks will all be on a line.

I am aware that three-horse equalizers are known constructed with levers which are fulcrumed on a clevis or draft-bolt, and are connected by links to the center of the double-tree, and which operate on the same general principle as my equalizer; but mine differs therefrom both in the general organization of the parts—according to which the levers are fulcrumed on the double-tree—and in the special constructon of such levers.

I claim as my invention—

1. The combination, substantially as before set forth, with the double-tree and single-trees, of the trace-levers fulcrumed on the double-tree and the draft-links pivoted to the trace-levers.

2. The combination, substantially as before set forth, with the double-tree and single-trees, of the forked trace-levers fulcrumed on the double-tree and the draft-links pivoted to the trace-levers.

In testimony whereof I affix my signature in presence of two witnesses.

JOHN D. WHITE.

Witnesses:
  THEO. AMENT,
  S. B. LATTNER.